United States Patent [19]

Martin

[11] 4,195,801
[45] Apr. 1, 1980

[54] PARTIAL PILOTING, LIFT PROPELLING AND PROPELLING SYSTEM

[76] Inventor: Joseph E. Martin, Aux Meules Cogny-69640, Denice, France

[21] Appl. No.: 853,896

[22] Filed: Nov. 22, 1977

[30] Foreign Application Priority Data

Nov. 24, 1976 [FR] France .................... 76 36142

[51] Int. Cl.$^2$ .................... B64C 31/02; B64D 27/00
[52] U.S. Cl. .................... 244/16; 244/56; 244/DIG. 1
[58] Field of Search ............ 244/16, 52, 56, DIG. 1

[56] References Cited

U.S. PATENT DOCUMENTS

| 2,423,625 | 7/1947 | Smith | 244/56 X |
| 3,065,929 | 11/1962 | Holland | 244/52 X |
| 3,936,012 | 2/1976 | Murray | 244/16 |

FOREIGN PATENT DOCUMENTS 1182962  12/1964  Fed. Rep. of Germany .... 244/DIG. 1

OTHER PUBLICATIONS

Dwiggins, "A Pilot's Eye View of Hang Gliding", Plane & Pilot, vol. 10, No. 9, Sep. 1974, pp. 25-26.

Primary Examiner—Barry L. Kelmachter
Attorney, Agent, or Firm—Lerner, David, Littenberg & Samuel

[57] ABSTRACT

A lift and propulsion system for partial piloting of a pendular effect piloted aircraft having a gliding structure. The system comprises a frame having a frame axis which is parallel to the pitch axis of the aircraft, the frame being rotatable about the frame axis. A pair of engines are supported by the frame and are each provided with throttle valves for controlling the power or speed of such engines. A rotation control lever arm having one end connected to the frame and the other end movably connected to the gliding structure is provided for controlling the rotation of the frame about the frame axis to control the orientation of the thrust of the engines, and a throttle control mechanism is provided for simultaneously and differentially controlling the power of the engines. The throttle control mechanism comprises a handle having a longitudinal axis and a support member for supporting the handle for rotation about such longitudinal axis. The support members are pivotally mounted on the frame to pivot about a pivot axis which is perpendicular to the longitudinal axis of a handle. A pair of cables are provided which extend from the throttle valves and are connected to the handle on opposite sides of the longitudinal axis.

6 Claims, 7 Drawing Figures

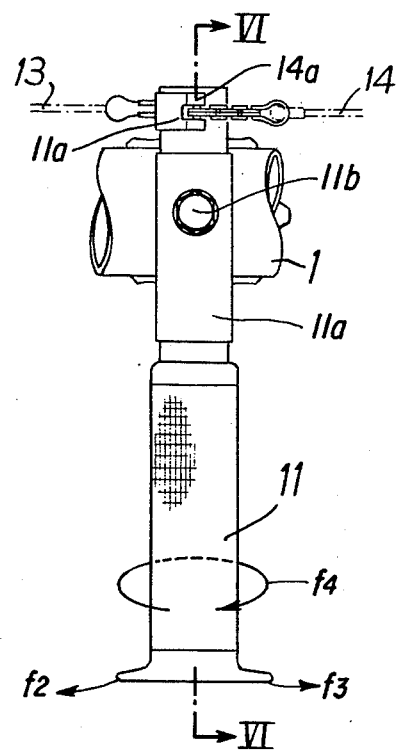
FIG. 5
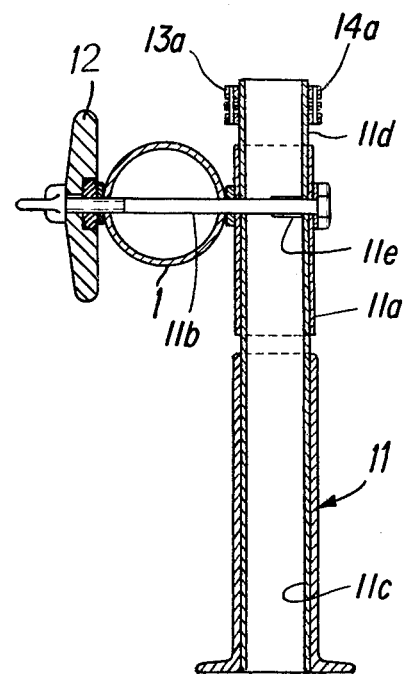
FIG. 6
FIG. 8
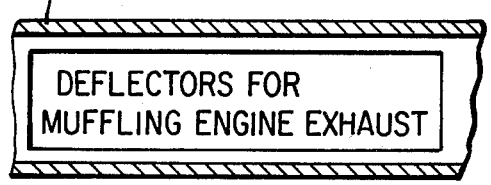
DEFLECTORS FOR
MUFFLING ENGINE EXHAUST
FIG. 7
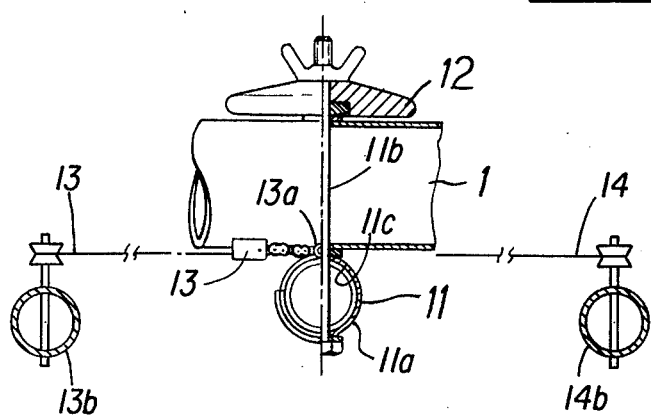

PARTIAL PILOTING, LIFT PROPELLING AND PROPELLING SYSTEM

BACKGROUND OF THE INVENTION

The present invention relates to the general problem of partial piloting, lift propelling and propelling system designed for pendular effect piloted aircraft including gliding structure or wing.

Piloting through pendular effect is known since the birth of aviation: CAYLEY-LILIENTHAL-CHANUTE had already thought of using the displacement of the pilot's body to steer a light weight aircraft.

As it is well known, piloting such aircraft initially consists in performing some descending evolutions, these evolutions remaining restricted because the pendular effect, while it does permit sufficient pitch control, does not have, adversly, a sufficient influence as far as roll control is concerned, and is totally inefficient for yaw control.

In an attempt to improve the performance of such aircrafts, it has been suggested to fit them with an engine giving the aircraft a traction or a thrust which the pilot could use to climb.

This solution solves the specific problem of propulsion only but does not give a satisfying answer to the overall problem. That is due to the fact that the proposed technical solutions have an influence on the pitch control, sufficiently mastered anyway through pendular effect but they have no influence at all on the roll and yaw controls which are indispensable for achieving the handling necessary to ensure the safety of the flight (e.g. dodging maneuvers, etc.).

Consequently the aim of the present invention is to solve the general problem aforementioned by using a partial piloting, lift and propulsion system for pendular effect piloted aircraft which, whilst solving the double problem of lift, even at zero true airspeed, and of propulsion, will also solve simultaneously the problem of roll and yaw controls. With such a system total flight safety can be achieved without any limitation in weight, or piloting through pendular effect, while at the same time providing such aircraft with maneuvering capabilities never attained in the past.

SUMMARY OF THE INVENTION

In accordance with the present invention, there is provided a lift and propulsion system for a pendular effect piloted aircraft having a gliding structure. The lift and propulsion system, according to one aspect, comprises a rotatable frame having a frame axis which is parallel to the pitch axis of the aircraft. The frame is adapted to be supported by the gliding structure to be rotatable about the frame axis. A pair of engines each of which include throttle valves for controlling the power of the engines, are supported by the frame. Means are provided for controlling the rotation of the frame about the frame axis in order to control the orientation of the thrust of the engines. A throttle control means is provided for simultaneously and differentially controlling the power of the engines. The throttle control means comprises a handle having a longitudinal axis and a support member for supporting the handle for rotation about such longitudinal axis. The throttle control means further includes pivot mounting means for pivotally mounting the support member on the frame intermediate the pair of engines so as to be pivotable about a pivot axis perpendicular to the longitudinal axis. A pair of cables, each of which is connected at one end to a throttle valve of the engines, are attached to the handle on opposite portions with respect to the longitudinal axis. In this way, rotation of the handle will control the power of the engines whereas pivoting of the support member will control the differential speeds of the engines.

According to another aspect of the present invention, the frame for supporting the engines includes displaced portions which are displaced from the frame axis. The engines are supported on these displaced portions so that the thrust of the engines will aid in the rotation of the frame about the frame axis.

In accordance with a preferred embodiment of the present invention, the control means for controlling the rotation of the frame comprise a control lever having a first end fixably connected to the rotatable frame. The second end of the control lever is movably connected to a portion of the gliding structure so that movement of the second end of the lever will cause the rotatable frame to rotate. An adjustable brake is provided for the second end of the control lever for holding the position of the control lever to thereby hold the orientation of the frame in any desired position.

These and further features and characteristics of the present invention will be apparent from the following detailed description in which reference is made to the enclosed drawings which illustrate the preferred embodiment of the present invention.

BRIEF DESCRIPTION OF THE DRAWINGS

An exemple of the new device is shown in drawings as follows.

FIG. 5 is a plan view of the throttle handle in accordance with the present invention for the simultaneous and differential control of the engines in the present invention.

FIG. 6 is a sectional view along line VI—VI of FIG. 5.

FIG. 7 is an elevational view, partly in section of the throttle handle shown in FIG. 5.

FIG. 8 is a partial cross-sectional view showing, on a different scale, a part of the frame in accordance with the present invention.

DETAILED DESCRIPTION OF THE PREFERRED EMBODIMENT

Figure 1:
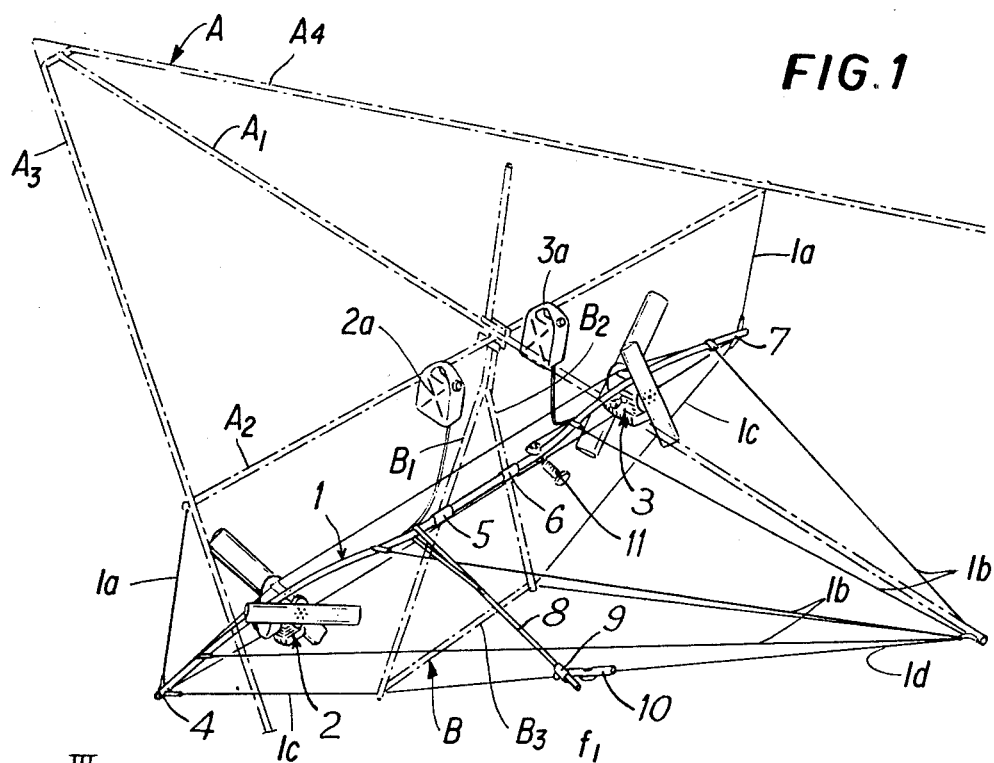
FIG. 1 shows a perspective view of the present invention as mounted to the frame of the gliding structure of a pendular effect piloted aircraft.

The apparatus in accordance with the present invention includes engines attached symetrically on either side of the trapeze (or of the parallel bars) to a frame made of a tube attached at both ends to the side cables which link the wings to the trapeze (or to the parallel bars) as well as to the struts of the pendular control.

This frame has one degree of freedom around the pitch axis, which enables a rotation of the engines propulsion axes relatively to the airframe. This tube frame can be arched; in which case its shape is such that the moment of its engines' propulsion vectors relative to its axis helps and does not oppose the effort required of the pilot or the servo-control to make a rotation.

The engine, frame, keel or tail unit structures are stiffened by tensing cables.

When the internal combustion engines are not turbojets, in order that their noise, particularly during slow or nil airspeed parts of the flight, does not jeopardize its industrial or commercial development for ecological reasons, the tube frame is internally fitted with deflectors to acts as an extra exhaust port silencer.

The wide range of airspeeds available with the propelling system and which includes so-called negative airspeeds, for instance when a hovering vertical descent is performed, renders necessary the use of either a variable pitch system on one propeller per engine or the fitting of two propellers—possibility disconnectable—at either end of the engine shaft, one with a low pitch for take-off, landing, or hovering flight the other with the adequate pitch for flying at cruising speed.

The rotation of the engine and frame structure is controlled either by a computer-driven irreversible engine fitted on one of the trapeze struts or manually by a tube lever linked to the tube frame. In the latter case the movement of the lever can be slowed or stopped by the pilot by means of a brake which slides along one of the two airframe wires which link the base of the trapeze to the rear of the keel or of the tail unit. This lever can be used in an emergency mode in case of a failure of the computer driven control.

A single and differential control, fixed on the tube frame, the trapeze or the engine and frame structure rotation control lever, allows the pilot to operate simultaneously the engine throttle-valves by means of a revolving handle. It also allows a differential action on those same throttle-valves through the rotation of the tube (around which revolves the revolving handle) around the axis of its fixing to the tube frame or the trapeze. This rotation causes simultaneously, by a lever effect, an extra traction of one of the throttle cables and a loosening of the other. This system also allows, when the apparatus is geared in the "hovering only" position, the desynchronization of the RPM's of the engines, and thus improve the roll rate necessary to insure the safety of the flight despite the inertia due to the weight of the engines. When the apparatus is geared in the propulsion only position, it allows the synchronization of the engine RPM's during cruise flight or, adversely, through desynchronization, the possibility of controlling the aircraft yaw-wise, this being impossible to perform by means of pendular effect only. When the apparatus is geared in an intermediate position, it offers new possibilities in the field of aerobatics derived from the loop and the barrel roll.

The inclosed drawings describe, as an example, one type of realization made according to this invention, in fact a four-propeller, twin engine formula, with a manual engine and frame structure rotation control and throttle handle on the tube frame, fixed on a standard Rogallo wing.

As shown in FIG. 1, such a wing comprises, as known, a frame A including a longitudinal beam $A_1$, a cross-brace $A_2$ and two bars $A_3$ and $A_4$ extending between the front end of the longitudinal beam $A_1$ to the ends of the cross-brace $A_2$. The frame A is thus substantially of triangular shape and supports a flying surface not shown. The frame A is also provided with the hung structure B adapted for example to be supported at the junction of the beams $A_1$ and the cross-brace $A_2$. Such a structure B is known under the name of trapeze and comprises generally two rods or struts $B_1$-$B_2$ extending downwardly from the frame A. The lower ends of the struts $B_1$ and $B_2$ are joined together by a horizontal tube $B_3$. As known, the trapeze B is the structure on which a pilot hung from the frame A acts to steer the aircraft in flight by using the displacement of his own body.

As shown in FIG. 1, the system of the invention includes an arched tubular frame 1 fixed to the structure B by means of bearings or sleeves 5 and 6 and retained by wires $1a$ extending between parts 4, 7 of the frame 1 and the ends of the cross-brace $A_2$. Wires $1b$ are also provided between the frame 1 and the rear end or tail of the beam $A_1$ and between the same and structure B. Wires $1c$ and $1d$ are also provided which extend respectively from parts 4, 7 to the structure B, and from the rear end or tail of beam $A_1$ to the structure B.

The frame 1 supports two engines 2 and 3 which rotate, one clockwise, the other counterclockwise. The engines 2 and 3, fixed to the arched portion of said frame, are fed with combustible by means of tanks $2a$ and $3a$ secured to the beam $A_2$. The tubular frame 1 also acts as a muffler into which the engines 2 and 3 exhaust. For this purpose, the frame 1 is internally fitted with deflectors, shown schematically in FIG. 8.

Figure 2:
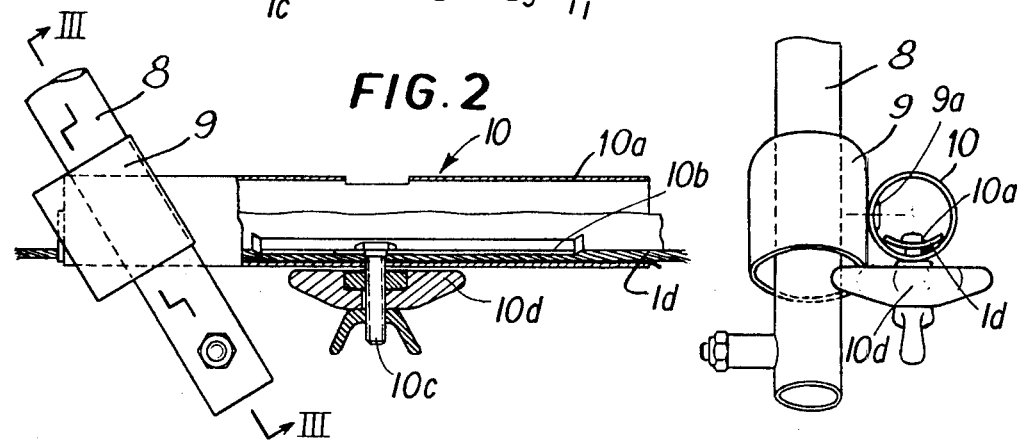
FIG. 2 is a partial sectional view showing on a greater scale the adjustable brake in accordance with the present invention for controlling rotation of the engine support frame of the present invention.
Figure 4:
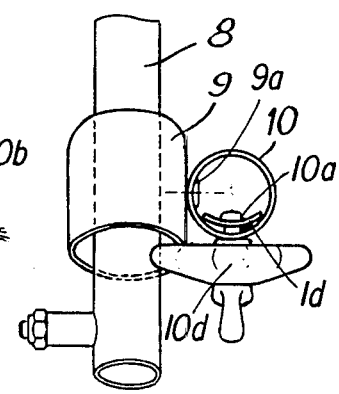
FIG. 4 is an elevation of the adjustable brake shown in FIG. 2.
Figure 3:
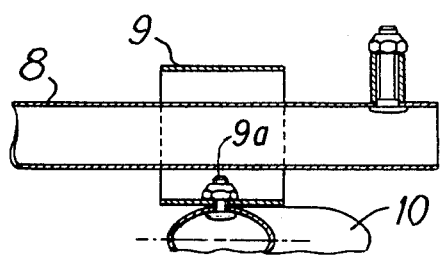
FIG. 3 is a sectional view along line III—III of FIG. 2.

The frame 1 is capable of being rotated around itself on approximately a half-pi radian angle by means of lever 8 which is fixably secured to the frame 1. The lever 8 extends rearwardly and its rear end is slidably engaged into a sleeve 9 which, in turn, is mounted by a pivot $9a$ on a brake 10. According to FIGS. 2–4, the brake 10 comprises a tube $10a$ slidably mounted on the tensioning cable $1d$ linking the tail of beam $A_1$ and the structure B. The tube $10a$ comprises an inner plate $10b$ forming a jaw to encompass the tensioning cable $1d$. The inner plate $10b$ is provided with a threaded spindle $10c$ passing across the tube $10a$ and having outside the latter a nut or knob $10d$ to adjust the friction or the tightening force applied to the cable $1d$ located between the plate $10b$ and the tube $10a$.

With such an arrangement, the pilot may control the friction applied to the cable and either stop or only slow the slide of the tube $10a$ on the said cable. When the tube $10a$ is stopped, the lever 8 maintains the orientation of the frame 1 and consequently the direction of the traction or thrust vectors of the engines 2 and 3. On the contrary, when the tube $10a$ is only slowed, the pilot may act, for example according to the arrow $f_1$ (FIG. 1) to cause the tube $10a$ to slide on the cable $1d$. During this motion, the tube $10a$ pushes the sleeve 9 which pivots on the pivot $9a$ and which in turn pushes the lever to cause the frame 1 to rotate in the bearings 5–6, thus permitting the orientation of the traction or thrust vectors.

To control the engines' throttle-valves, the system of the present invention is provided with a throttle-handle 11 supported on the tubular frame 1. The throttle-handle 11 comprises a bushing $11a$ secured on the tubular frame 1 by an axle $11b$ passing across the bushing $11a$ and having a threaded part on which is screwed a knob 12. The knob 12 is provided to adjust the friction between the tubular frame 1 and the bushing $11a$ and to permit the rotation of the bushing $11a$ as shown by the arrows $f_4$ and $f_3$. The bushing $11a$ serves to support a revolving handle $11c$ for rotational movement about its longitudinal axis. The revolving handle $11c$ has a cylindrical part 11d engaged into the bushing 11a. The part 11d defines a transversal slot 11e extending about 180° and across which passes the axle 11a. The end of the part 11d retains in two diametrically opposed points 13a, 14a two traction cables 13, 14 attached to the throttle-valves 13b, 14b (FIG. 7) of the engines.

When the pilot operates the rotation of the revolving handle 11c on its own longitudinal axis as shown by the arrow $f_4$ (FIG. 5), the end of the part 11d causes the cables 13, 14 to be wound which in turn control simultaneously in a same manner the throttle-valves 13b, 14b of the two engines 2 and 3. When the pilot moves or pivots the throttle-handle 11c on the axle 11b, as for example in the direction of the arrow $f_2$, the end 11d pulls the cable 13 and simultaneously releases the cable 14 so that a differential effect is imposed on the throttle-valves 13b, 14b of the two engines 2 and 3.

The thrust of the propellers, being only lift-producing during a hovering or vertical flight and only propelling during normal cruise flight, can be divided into a lift-producing component and a propelling component when the engine and frame structure rotation control lever 8 is placed in an intermediate position.

This final capability can be used when transiting from hovering or vertical flight to normal cruise flight, for instance when taking off from an area surrounded by obstructions with a zero force surface wind.

It can also be used between take off and landing when operating from an area clear of obstructions or with some surface wind.

The operation of the throttle handle 11 on its two axes allows the control of the aircraft around its axes of roll and yaw. This control, which has a variable effect—and sometimes no effect—according to the position of the engine and frame structure rotation control lever 8, is a necessary complement to the pendular effect control, which is in itself effective in pitch only and is itself insufficient in roll and in yaw.

While the preferred embodiment of the present invention has been shown and described, it will be understood that such is merely illustrative and that changes may be made without departing from the scope of the invention as claimed.

We claim:

1. A lift and propulsion system for partial piloting of a pendular effect piloted aircraft having a gliding structure, said system comprising:
   a frame having a frame axis parallel to the pitch axis of the aircraft, said frame being rotatable about said frame axis;
   a pair of engines supported in spaced relation on said frame, each of said engines having throttle valves for controlling the power of said engines;
   means for controlling the rotation of said frame about said frame axis in order to control the orientation of the thrust of said engines; and
   a throttle control means for simultaneously and differentially controlling said throttle valves of said engines, said throttle control means comprising:
   a handle having a longitudinal axis;
   a support member for supporting said handle for rotation about said longitudinal axis;
   pivot mounting means for pivotally mounting said support member on said frame at a position intermediate said engines, so that said support member is pivotable about a pivot axis perpendicular to said longitudinal axis; and
   a cable for each of said throttle valves of said engines, said cables extending from said throttle valves to said handle and being attached to said handle on opposite sides of said longitudinal axis.

2. The system of claim 1 wherein said means for controlling the rotation of said frame comprises a lever arm having a first end and a second end, said first end being connected to said frame, and lever arm mounting means for movably mounting said second end of said lever arm to said gliding structure to be movable relative to said gliding structure, said lever arm causing said frame to rotate as said second end of said lever arm is moved relative to said gliding structure.

3. The system of claim 2 wherein said lever arm mounting means includes brake means for adjustably braking the movement of said second end of said lever arm as it is moved relative to the gliding structure.

4. The system of claim 3 wherein said lever arm mounting means including said brake means comprises: a first sleeve in shich said lever arm is slidably movable; a second sleeve for slidable mounting on a portion of said gliding structure to be slidably movable along said portion of said gliding structure, said first and second sleeves being pivotally connected; an inner plate within said second sleeve; and means for connecting said inner plate to said second sleeve to frictionally engage said portion of said gliding structure between said plate and the inner surface of said second sleeve to brake the movement of said second end of said lever arm relative to said gliding structure.

5. The system of claim 1 wherein said support member comprises a cylindrical sleeve; wherein said handle includes a cylindrical part rotatable within said cylindrical sleeve about said longitudinal axis, said cylindrical part including a transverse slot through a portion of said cylindrical part, said slot being transverse to the longitudinal direction of said longitudinal axis; and wherein said pivot mounting means comprises a shaft extending through said cylindrical sleeve and passing through said transverse slot in said cylindrical part of said handle to retain said handle within said cylindrical sleeve while permiting relative rotation of said handle within said sleeve, said shaft being connected to said frame.

6. The system of claim 1 wherein said frame is a tubular member having internal deflectors therein, and wherein said engines exhaust into said tubular frame.

* * * * *